(12) United States Patent
Hansen

(10) Patent No.: US 8,137,096 B2
(45) Date of Patent: Mar. 20, 2012

(54) DEVICE FOR PRODUCING BLOWMOLDED CONTAINER PRODUCTS FROM PLASTIC MATERIAL

(76) Inventor: Bernd Hansen, Sulzbach-Laufen (DE)

( * ) Notice: Subject to any disclaimer, the term of this patent is extended or adjusted under 35 U.S.C. 154(b) by 83 days.

(21) Appl. No.: 12/735,115

(22) PCT Filed: Jan. 20, 2009

(86) PCT No.: PCT/EP2009/000307
§ 371 (c)(1),
(2), (4) Date: Jun. 17, 2010

(87) PCT Pub. No.: WO2009/092554
PCT Pub. Date: Jul. 30, 2009

(65) Prior Publication Data
US 2010/0310701 A1 Dec. 9, 2010

(30) Foreign Application Priority Data
Jan. 25, 2008 (DE) .......................... 10 2008 006 073

(51) Int. Cl.
*B29C 49/70* (2006.01)
(52) U.S. Cl. ....................................... 425/537; 425/539
(58) Field of Classification Search .................. 425/524, 425/537, 539
See application file for complete search history.

(56) References Cited

U.S. PATENT DOCUMENTS 3,597,516 A * 8/1971 Harwood ...................... 425/539
3,626,589 A * 12/1971 Hansen ......................... 425/537

FOREIGN PATENT DOCUMENTS

| DE | 1 840 868 U | 11/1961 |
| DE | 2 165 816 A1 | 7/1972 |
| DE | 199 26 329 A1 | 12/2000 |
| DE | 103 23 335 A1 | 12/2004 |
| DE | 10 2004 004 755 A1 | 8/2005 |
| JP | 04 101826 A | 4/1992 |

* cited by examiner

*Primary Examiner* — Robert B Davis
(74) *Attorney, Agent, or Firm* — Roylance, Abrams, Berdo & Goodman, L.L.P.

(57) ABSTRACT

A device for producing blowmolded container products (11) from plastic material, using single mold parts (7) movable along a production line (5) and in pairs toward one another and away from one another to close or open a production mold. The container products (11) are molded and exit after the demolding procedure in the form of a container chain (9) moved along the production line (5). A demolding unit (3) engages the exiting container chain (9) outside the production mold to support the demolding procedure. The demolding unit (3) has a force drive (17) deflecting the container chain (9) out of the production line (5) into back and forth movement.

12 Claims, 4 Drawing Sheets

DEVICE FOR PRODUCING BLOWMOLDED CONTAINER PRODUCTS FROM PLASTIC MATERIAL

The invention relates to a device for producing blowmolded container products from plastic material by individual mold halves movable along a production line and in pairs toward one another and away from one another to close and/or open a production mold in which the container products are molded. Following the demolding process, the container products emerge in the form of a container chain moved along the production line. To facilitate the demolding process, a demolding unit acts on the emerging container chain outside the production mold.

Methods and devices for manufacturing plastic container products are known in the prior art (DE 199 26 329 A1). To manufacture such products, a tube of plasticized plastic material is extruded into a molding device. One end of the tube is closed by heat sealing. The closed end tube is expanded by generating a pneumatic pressure gradient acting on the tube and applied to the molding walls of the molding device. The molding device comprises two opposite individual molding halves to form the container. In carrying out the bottelpack® method known in this technical field, the respective plastic container is filled under sterile conditions in the molding device by a suitable charging mandrel. After the charging mandrel has been removed, the filled container is hermetically sealed, and a specific head geometry is formed. For forming the actual plastic container in which fluid is later stored, two individual mold halves in the form of molding jaws may be moved toward one another by, for example, hydraulic or servo-electric drive, to achieve a closing position and away in opposite directions from one another into one of their opening positions. To achieve very high ejection rates of container products, DE 103 23 335 A1 describes a multi-station arrangement, where the various molding steps are divided among different stations arranged one after the other in an imaginary circular arc to form a type of carousel arrangement. This arrangement permits very high cycle frequencies for the plastic products to be ejected. In such systems these plastic products emerge in the form of a container chain along a production line.

A suitable synthetic plastic material for the container products is typically polyethylene, which can be processed quite well in such production systems and is, therefore, preferred. However, the use of polyethylene as a material for containers causes problems if the fill material filling the respective container product is a liquid that is to be autoclaved at 121° C. This problem is especially present, for example, for a highly sensitive pharmaceutical composition. In such cases, the prior art makes sure that, for example, the fill orifice of the container tube is covered by a sterile barrier at least from the time of the orifice's formation up to the filling of the associated container in a cleanroom. In this case, good results can be achieved, if, as described in DE 10 2004 004 755 A1, a sterile medium is conveyed by the barrier in the direction of the container fill orifice using a medium conveying device in order to improve the sterility. Another or an additional strategy for enhancing the sterility is simply to provide higher processing temperatures, for example, during the production of the tube for the container product or during the filling process of the fill material. However, such a procedure conflicts with the temperature sensitivity of the polyethylene provided as the synthetic plastic material.

Since the processing temperature of the polypropylene material is much higher than that of polyethylene and since a higher autoclaving temperature of 121° C. is possible, the sterility requirements can be satisfied in a simple and cost-efficient way. However, considerable processing problems present an obstacle to the use of polypropylene.

Due to the much higher outlet temperatures resulting from the use of a propylene material, and due to the resulting stiffer surface finish as compared to containers made of polyethylene, difficulties occur in separating the containers from the respective walls of the production mold. To remedy these difficulties, document DE 21 65 816 C3 proposes a device for producing molded, continuous, and contiguous containers made of polypropylene material. A demolding unit has a conveying device acting on the emerging container chain outside the production mold and imparting to the container chain a draw-off speed less than the speed of movement of the production mold. As a result of this procedure, the containers experience an elastic contraction that in turn is designed to facilitate the separation of the containers from the walls of the mold. However, this approach does not ensure that the demolding process will run efficiently, especially when high cycle frequencies are to be achieved.

SUMMARY OF THE INVENTION

An object of the invention is to provide a device permitting production of container products from polypropylene material in a simple, economical, and reliable manner.

The invention basically achieves this object with a device having a demolding unit with a power drive. By the demolding unit, the container chain can be deflected out of the production line into a back-and-forth movement. The container chain then undergoes a shaking or oscillatory motion in the outlet area so that the separation from the walls of the mold is guaranteed even at the high cycle frequencies required for an efficient operation.

In these circumstances, the device is preferably configured such that the container chain can be deflected at least essentially in the direction of the closing and opening movements of the individual mold halves by the power drive of the demolding unit. Consequently, the container chain is put into an oscillatory motion extending transversely to the conveying direction.

In this respect, the device can be preferably configured such that the demolding unit has a driver arrangement. The driver arrangement is drive-coupled to the power drive and has two bearing surfaces. The container chain, moving along the production line, is guided on the bearing surfaces. The deflection forces can be transferred to the container chain over the bearing surfaces.

This driver arrangement can have a passage channel with the wall sections forming a skirt for the moving container chain as well as the bearing surfaces for the transfer of the deflection forces to the container chain.

In this respect, the device is preferably configured such that the passage channel has moveable wall sections that can be moved into a closed position corresponding to the closed skirt of the container chain, and into an open position. During the open position, the driver arrangement can be forced to engage with the container chain and to disengage from it. In this way, the device can be made ready for use in an especially easy way in that on startup of production, the driver arrangement with open wall sections of the passage channel is moved up to the container chain. Then, the passage channel is closed to form a skirt for the container chain.

The driver arrangement can have a support frame drive-connected to the motor serving as the power drive and forming the stationary wall sections of the passage channel. In this case, the moveable wall sections of the passage permitting opening and closing of the skirt are mounted on the support frame so that they can be pivoted between the open position and the closed position.

In the case of containers with a small volume, for example, ampules, the production process is typically configured such that a plurality of containers lying next to one another are molded simultaneously. They form a wide area container chain with a plurality of containers lying next to one another and are combined to form a container chain train. The device can be configured such that the length of the support frame is equal to or larger than the width of the container chain train and that the moveable wall sections can be hinged to the end regions of the support frame located laterally of the container chain train.

Furthermore, the device can be preferably configured such that the demolding unit is mounted to be adjustable in position on a device frame between a rest position located at a distance from the production line and a working position supporting the demolding process at the container chain or the container chain train. As a result, the outlet area of the production mold is freely accessible for maintenance or adjustment measures when the demolding unit is in the rest position. Due to the position adjustable arrangement, the demolding unit can be made ready for use in a simple way. For this position adjustment, the device carrier is a component of the demolding unit, can have mounted thereon both the guide tracks for the driver arrangement and the motor serving as the power drive, and can be mounted on the device frame to be pivotable about an axis extending perpendicular to the direction of the production line and parallel to the guide plane of the guide tracks.

For the pivot movements between the rest position and the working position of the demolding unit, preferably a pivot drive in the form of a linear drive is connected in an articulated manner to the device carrier at a distance from its pivot bearing as well as to an articulated point and is located on the device frame at a distance from the pivot bearing of the device carrier.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
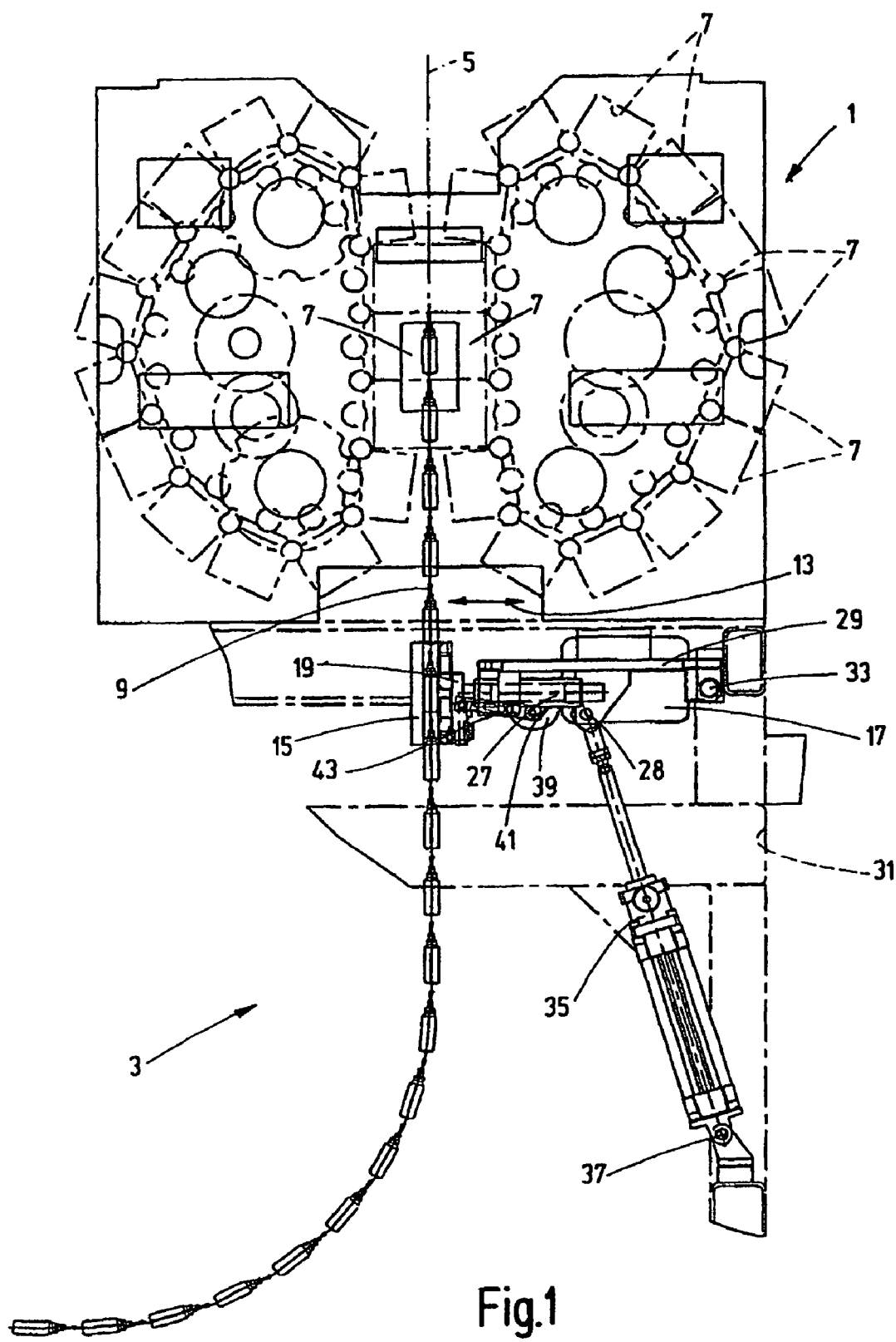
FIG. 1 is a schematic, highly simplified side elevational view of a molding device according to one exemplary embodiment of the invention, with the demolding unit in the working position.

In FIG. 1, the production segment is located at the top in the figure. The subsequent demolding unit is connected to the top production segment in the downward direction. The production segment 1 involves a device for carrying out a blowmolding process in accordance with the bottelpack® system known from the prior art, and, specifically, in an embodiment, in which the various molding steps are carried out at a number of stations along a production line 5. As in a carousel configuration, the individual mold halves 7, of which only some are numbered in FIG. 1, are moved toward each other in pairs on an imaginary circular arc path to form a closed production mold, and are moved away from each other again to open the mold. Since systems that work according to the bottelpack® method are known from the prior art, no need exists at this point to provide additional technical details of the production segment 1 in FIG. 1.

Figure 2:
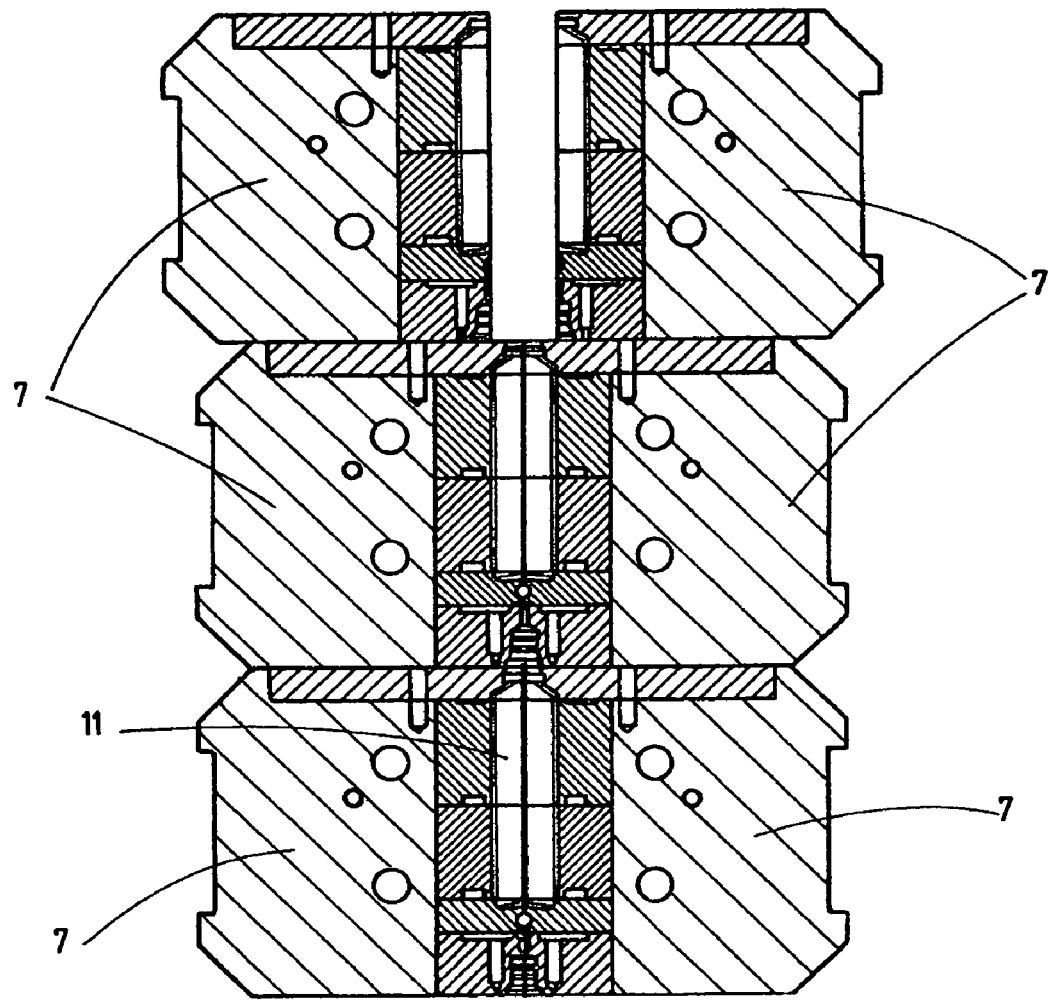
FIG. 2 is a side elevational view in section of one subsection of the production line of the device of FIG. 1, where the moveable individual mold halves can be moved into a position that closes the production mold where a container product along the line of an ampule is shown inside the production mold.
Figure 3:
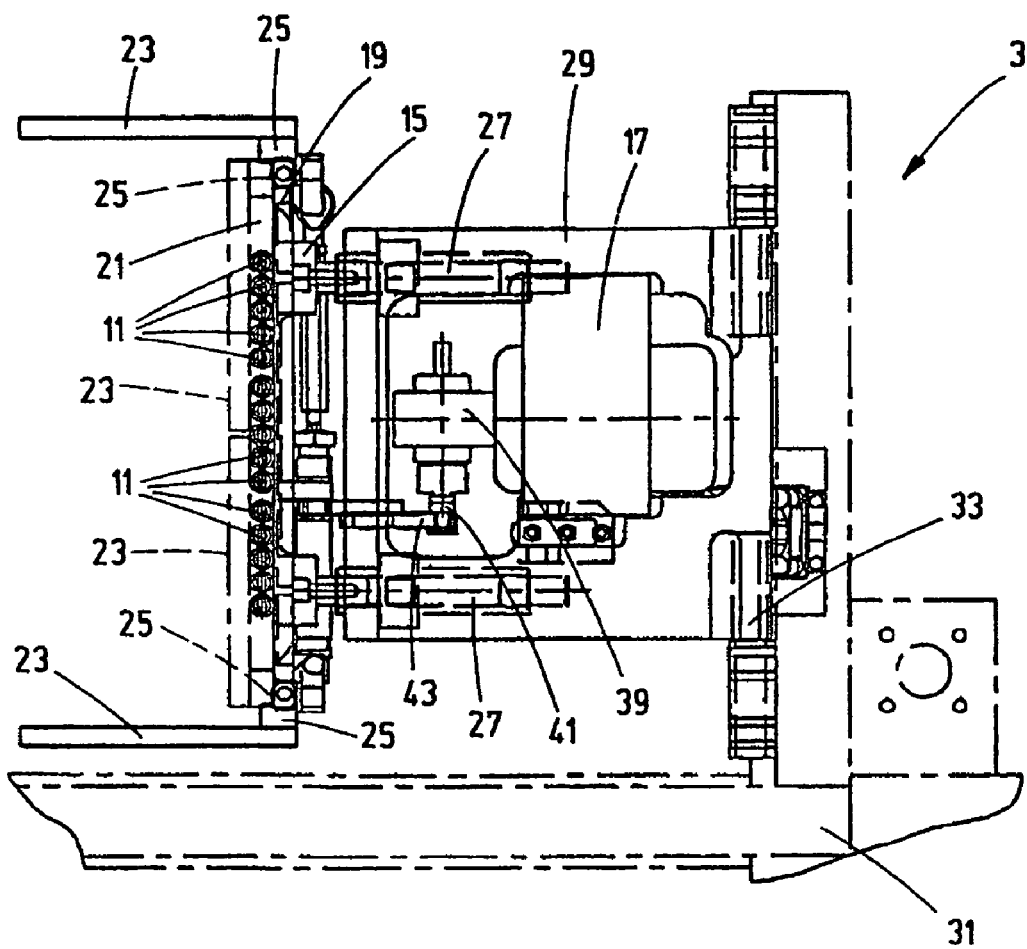
FIG. 3 is a top plan view in section of just the demolding unit of the device of FIG. 1, where a container chain emerging from the production mold in the form of a wide container chain train where a passage channel intended for the container chain train and having closed wall sections, indicated by dashed lines, forms a closed skirt, and where the solid lines denote the moveable wall sections in their open position.

FIG. 1 shows clearly that the resulting container chain 9 emerges from the production segment 1 along the production line 5 and then travels to the demolding unit 3. As shown in FIG. 3, the illustrated container chain 9 covers a wide area. A plurality of individual containers 11 having an ampule-like shape (FIG. 2), of which only a few are numbered in FIG. 3, next to one another in the container chain 9. To facilitate the separation of the containers 11 from the walls of the individual mold halves 7 moving away from each other at the outlet area of the production segment, the demolding unit 3 imparts to the container chain 9 a deflecting movement, as indicated with the double arrow 13 in FIG. 1. For this purpose, the demolding unit 3 has a driver arrangement 15 producing, in drive connection with an electric drive motor 17 the deflection movement of the container chain 9 to reliably separate the containers 11 from the wall sections of the mold.

Figure 4:
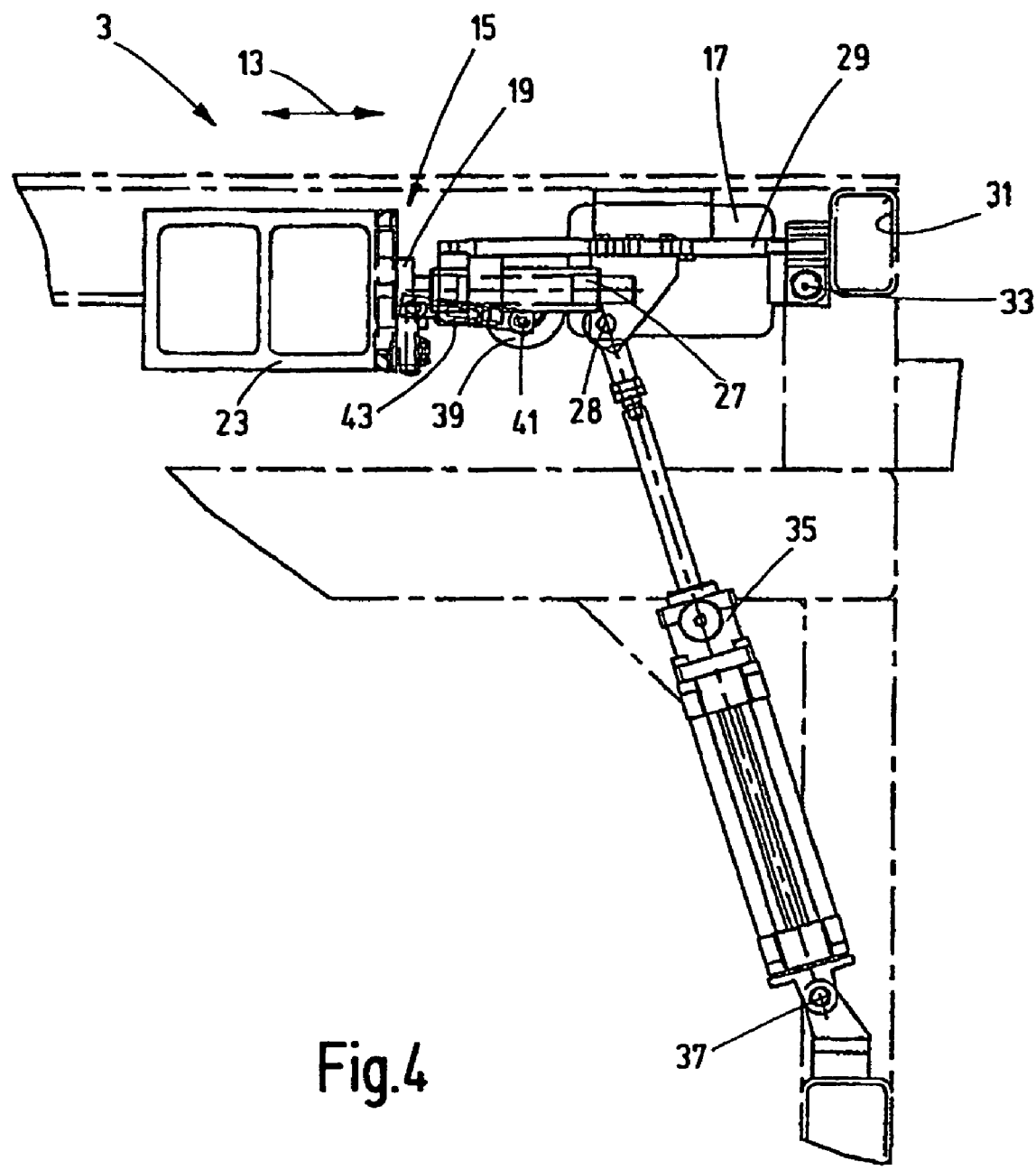
FIG. 4 is a side elevational view of the demolding unit of FIG. 3 in the working position, but with the wall sections of the passage channel in the open position.

The full technical details of the demolding unit 3 and the driver arrangement 15 are shown more clearly in FIGS. 3 and 4. Driver arrangement 15 forms, with the support frame 19, the stationary wall sections of a passage channel 21 (FIG. 3) for the container chain 9 with the containers 11. The movable wall sections 23 are pivoted on the support frame 19 and can be moved into an open position shown with the solid lines in FIG. 3. In this open position the container chain 9 can be moved easily into the open passage channel 21 to start up the device. The moveable wall sections 23 have angled frame legs 25 forming the hinge points at the ends of the support frame 19. The length of these frame legs 25 is adapted to the thickness dimensions of the containers 11 of the container chain 9. When the wall sections 23 are folded down into the closed position, as shown with the dashed line in FIG. 3, a form-fitting skirt of the container chain 9 is then formed in the passage channel 21.

The support frame 19 of the driver arrangement 15 is guided on guide tracks 27 for the deflection movements extending according to the double arrow 13 in FIGS. 1 and 4. Like the motor 17, these guide tracks are also mounted on a device carrier 29, which in turn is mounted on a device frame 31 of the demolding unit 3 to be pivotable about a pivot axis or bearing 33. At a distance from this pivot mounting, a linear drive 35 in the form of a hydraulic or pneumatic working cylinder is hinged at 28 on the device carrier 29. This working cylinder in turn is supported on the device frame 31 at a hinge point 37 at a distance from the pivot bearing 33.

Since the device carrier 29 of the demolding unit 3 is mounted in a pivotable manner on the device frame 31, the demolding unit can be folded down from the working position, shown in FIGS. 1 and 4, into a rest position by retracting the power drive 35, for adjustment and maintenance measures as well as preparation for startup. The driver arrangement 15 is located outside the outlet area of the container chain 9. For the startup of the device, the device carrier 19 is moved into the working position, shown in FIGS. 1 and 4, by moving out the power drive 35. Starting from the operating state shown in FIG. 4, the wall sections 23 in the open position are pivoted into the closed position to close the passage channel 21, i.e., to form a skirt of the container chain 9. FIG. 3 shows the most clearly that the motor 17 has an output gear 39 with an eccentric device 41 converting the motor rotational movement into a reciprocating movement. Eccentric device 41 is coupled to the support frame 19 by adjustable push rods 43. This gear system imparts to the support frame 19 and, thus, the container chain 9, located in the passage channel 21, a back-and-forth shaking motion. At the same time, it is possible to provide a stroke in the range of 10 to 20 mm long and, for example, one shuttle per second. In any case, the shaking motions in the outlet area of the container chain 9 ensure a reliable separation of the molded containers 11 from the walls of the mold, even if one uses materials, in particular polypropylene materials, that are difficult to demold and require high processing temperatures, or if the material to be demolded is very stiff. As a result, it is possible to exploit the advantages arising from the use of polypropylene materials, instead of polyethylene or a co-extruded multi-layered composite. These advantages are also due to the polypropylene material being able to be autoclaved at higher temperatures (121° C.). At the same time, it is even more advantageous to obtain the polypropylene material from just one extrusion head than it is to use the multi-layered systems referred to.

Instead of the depicted linear drive 35 in the form of a working cylinder for adjusting the position of the demolding unit 3 between the working position and the rest position, other kinds of drive and gear means can be provided. For example, a spindle drive and the like can be used. It is also possible to provide locking mechanisms that allow the demolding unit 3 to be releasably fixed in the working position and/or the rest position or in desired intermediate positions.

While one embodiment has been chosen to illustrate the invention, it will be understood by those skilled in the art that various changes and modifications can be made therein without departing from the scope of the invention as defined in the appended claims.

What is claimed is:

1. A device for producing blowmolded container products of plastic material, comprising:
    individual mold halves movable along a production line in pairs toward and away from one another to open and close production molds formed by said mold halves and forming the containers therein with the containers emerging as a container chain moved along a production line; and
    a demolding unit facilitating a demolding procedure of the containers from the production molds by acting on the container chain emerging from the production molds outside of the production molds, said demolding unit having a power drive deflecting the container chain out of the production line into a back-and-forth movement.

2. A device according to claim 1 wherein
    said power drive of said demolding unit deflects the container chain at least essentially in a direction of opening and closing movements of said individual mold halves.

3. A device according to claim 2 wherein
    said demolding unit has a driver arrangement drive-coupled to said power drive and has bearing surfaces on which the container chain moves and is guided along the production line and over which deflection forces can be transferred to the container chain.

4. A device according to claim 3 wherein
    said driver arrangement has a passage channel with wall sections forming a skirt for the container chain during movement thereof and has said bearing surfaces for transfer of the deflection forces to the container chain.

5. A device according to claim 4 wherein
    said passage channel has movable wall sections movable to a closed position corresponding to said skirt being closed about the container chain and to an open position in which said driver arrangement can be forced to engage and disengage the container chain.

6. A device according to claim 5 wherein
    said driver arrangement has a support frame drive-connected to a motor forming said power drive, said support frame forming stationary wall sections of said passage channel, said movable wall sections of said passage channel being mounted on said support frame, permitting opening and closing of said skirt and being pivotable between the open and closed positions thereof 7. A device according to claim 6 wherein
    said support frame is displaceably guided on guide tracks extending traversely to the production line and is coupled to said motor by an eccentric device converting rotational motion of said motor into a back-and-forth displacing motion.

8. A device according to claim 6 wherein
    said support frame has a width at least as great as a width of the container chain; and
    said movable wall sections are hinged to end regions of said support frame located laterally relative to the container chain;
    whereby said passage channel is formed for a wide area container chain having a plurality of containers lying next to one another and combined to form the container chain.

9. A device according to claim 8 wherein
    each of said movable wall sections comprises an angled frame having a short frame leg at one end of the respective movable wall section forming an articulation point on said support frame and defining a width of said passage channel measured in a direction of the back-and-forth movement and having a longer frame leg connected to said short frame leg thereof at a right angle and forming in the closed position thereof said bearing surfaces on and facing a wide side of the container chain.

10. A device according to claim 1 wherein
    said demolding unit is adjustably mounted on a device frame for movement between a rest position located at a distance from the production line and a working position supporting the container chain at the production line.

11. A device according to claim 7 wherein
    said guide tracks and said motor are mounted on a device carrier pivotably mounted on a device frame about a pivot axis perpendicular to the production line and parallel to a guide plane of said guide tracks.

12. A device according to claim 11 wherein
    a linear drive provides a pivot drive to transfer said demolding unit between the rest position and the working position and is connected in an articulated manner to said device carrier at a distance from said pivot axis thereof and to an articulation point located on said device frame at a distance from said pivot axis thereof.

* * * * *